T. F. KRAEMER.

COVER FOR UPRIGHT PIANOS.

No. 10,450. Reissued Feb. 26, 1884.

WITNESSES:

F. H. Rosenbaum.

Otto Pfordte.

INVENTOR

Theophila F. Kraemer.

BY Goepel & Raegener.

ATTORNEYS.

N. PETERS, Photo-Lithographer, Washington, D. C.

UNITED STATES PATENT OFFICE.

THEOPHILA F. KRAEMER, OF NEW YORK, N. Y.

COVER FOR UPRIGHT PIANOS.

SPECIFICATION forming part of Reissued Letters Patent No. 10,450, dated February 26, 1884.

Original No. 270,443, dated January 9, 1883. Application for reissue filed January 2, 1884.

*To all whom it may concern:*

Be it known that I, THEOPHILA F. KRAEMER, of the city of New York, in the county of New York and State of New York, have invented certain new and useful Improvements in Covers for Upright Pianos; and I do hereby declare that the following is a full, clear, and exact description thereof.

Upright piano-fortes have been heretofore covered by a means of a cover of baggy and clumsy appearance, which extended over the entire upper part of the piano and the keyboard. This cover, however, was mainly used for storage purposes. For parlor use, a so-called "scarf," or a covering equal in width with the top part of the piano, was employed, which extended over the top and dropped down over the ends of the piano.

The object of this invention is to furnish a cover for upright pianos by which the upper part of the same is inclosed in such a manner that it does not interfere with the sound of the instrument, and which has at the same time a very ornamental and attractive appearance; and the invention consists of a cover for upright pianos, which consists of a top piece or scarf that extends over the top of the piano and has pendent ends dropping over the ends of the piano, of a front piece of less length than the pendent ends, and of means at the back of the piano whereby the cover is retained in position securely on the top or upper part of the piano.

Figure 1:
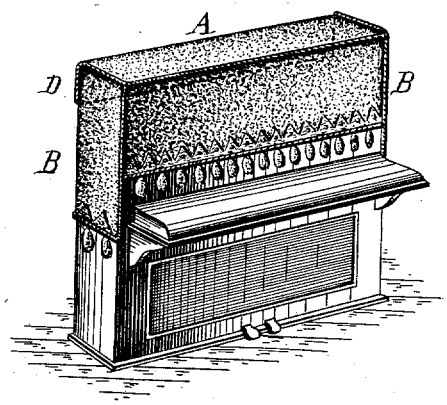
Figure 2:
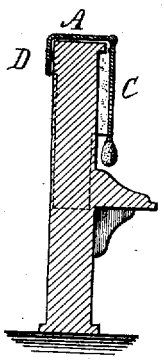
Figure 3:
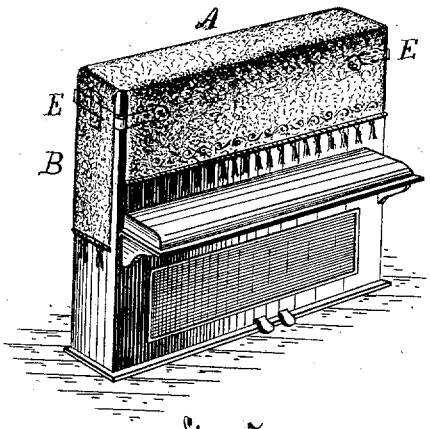
Figure 4:
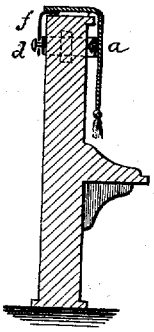
Figure 5:
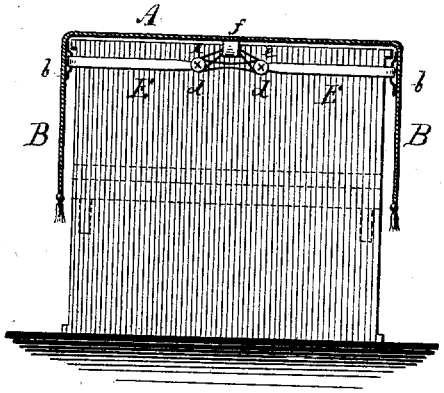

In the accompanying drawings, Figures 1 and 3 represent perspective views of an upright piano with my improved cover, showing two different forms of the same. Figs. 2 and 4 are vertical transverse sections of Figs. 1 and 3, and Fig. 5 is a rear view of Fig. 3.

Similar letters of reference indicate corresponding parts.

My improved cover is made of a top part or scarf, A, which is equal in width with the top of the upright piano. The scarf A extends over the top and drops, by means of pendent ends B B, down over the ends of the piano. A front piece, C, of less length than the pendent ends B B, forms the connecting front part of the cover, and is ornamented in any suitable manner. It is connected permanently to the scarf A and permanently or detachably to the pendent ends B B, as desired, so that in the latter case the front piece, C, can be thrown up over the top, so as not to interfere with the sound of the piano. The cover is retained by a short back piece, D, which extends from the rear top edge of the scarf A downwardly, and which is connected to the rear edge of the pendent ends B B. This back piece, D, requires to be of considerably less height than the front piece, as it simply serves to retain the cover in position on the piano and to prevent its dropping down in front. The back piece, D, is used whenever the cover is made to fit upright pianos of certain size.

When no special fit is required, and the cover is desired to be applied to pianos of different sizes, I employ in place of the retaining back piece, D, fastening-straps E E, which are applied to buttons *a a* at the rear side of the front piece, C, extended transversely across the end panels of the piano by guide-loops *b b* of the pendent ends B B of the scarf A to the back of the piano. The straps E E are hooked at the back of the piano by buttons *d d* to elastic loops *e e* of a center strap, *f*, applied to the rear top edge of the scarf A, as shown in Fig. 5. By means of the straps and elastic fastenings the cover can be applied to upright pianos of different sizes, the overlapping portions being then folded over the rear edges and retained at the back part of the piano. In either case a very ornamental cover for the upper part of upright pianos is furnished, which enhances the appearance of the same for parlor use, and which remains always in position, as it does not interfere with the opening of the lid nor with the music-rack.

It is evident that different means, located at the back of the piano, may be used for holding and retaining the cover in position on the upper part of the piano and preventing it from being drawn forward by the weight of the front, and I do not mean to be understood as limiting myself to the particular means above described.

If it be desired to open the upper front panel of the piano, the front piece is detached from the straps and thrown back over the top without removing the cover or interfering with the sounds of the piano.

Having thus described my invention, I claim as new and desire to secure by Letters Patent—

1. A cover for upright pianos, composed of a top piece or scarf having pendent ends, a connecting front piece, and means arranged at the back of the piano whereby the top and front pieces are retained on the upper part of the piano, substantially as set forth.

2. A cover for upright pianos, composed of a top piece or scarf having pendent ends, a front piece of less length than the pendent ends, and means at the back of the piano whereby the top and front pieces are retained on the upper part of the piano, substantially as specified.

3. A cover for upright pianos, consisting of a top piece or scarf having pendent ends, a front piece of less length than the pendent ends, and adjustable fastening-straps, which extend from the front piece across the ends of the piano to the back of the same, and are applied to a supporting center strap of the top piece or scarf, substantially as set forth.

In testimony whereof I affix my signature in presence of two witnesses.

THEOPHILA F. KRAEMER.

Witnesses:

LOUIS C. RAEGENER,

OTTO PFORDTE.